(12) United States Patent
Lo et al.

(10) Patent No.: US 6,324,945 B1
(45) Date of Patent: Dec. 4, 2001

(54) PREPARATION TOOL FOR SHIELDED CABLES

(75) Inventors: Denny Lo, Danbury; David Valentukonis, Southington, both of CT (US)

(73) Assignee: The Siemon Company, Watertown, CT (US)

( * ) Notice: Subject to any disclaimer, the term of this patent is extended or adjusted under 35 U.S.C. 154(b) by 0 days.

(21) Appl. No.: 09/448,681

(22) Filed: Nov. 23, 1999

Related U.S. Application Data

(60) Provisional application No. 60/110,296, filed on Nov. 30, 1998.

(51) Int. Cl.[7] .................................. H02G 1/12
(52) U.S. Cl. ............................. 81/9.44; 30/90.1
(58) Field of Search .............. 81/9.4, 9.44; 7/107, 7/158, 163, 164; 30/90.1, 233

(56) References Cited

U.S. PATENT DOCUMENTS

| | | | |
|---|---|---|---|
| Re. 30,342 | * | 7/1980 | Perrino ................................... 81/9.4 |
| 3,872,746 | * | 3/1975 | Wittes et al. ......................... 30/90.1 |
| 4,188,702 | * | 2/1980 | Herbert ................................ 81/9.51 |
| 4,480,374 | * | 11/1984 | Meyer .................................... 7/107 |
| 4,485,696 | * | 12/1984 | Bieganski .............................. 30/90.1 |
| 4,677,702 | * | 7/1987 | Cairns .................................. 81/9.44 |
| 5,009,006 | * | 4/1991 | Sawyer et al. ....................... 30/91.1 |
| 5,150,522 | * | 9/1992 | Gwo-Jiang .......................... 81/9.44 |
| 5,265,339 | | 11/1993 | Nilsson . |
| 5,351,333 | * | 9/1994 | Chambers ............................ 81/9.44 |
| 5,402,561 | * | 4/1995 | Cerquone et al. ...................... 7/107 |
| 5,435,029 | * | 7/1995 | Carlson, Jr. et al. .................. 81/9.4 |
| 5,713,132 | | 2/1998 | Tarpill . |
| 6,058,606 | * | 5/2000 | Hepworth ............................ 30/90.1 |
| 6,224,423 | | 5/2001 | Yip et al. . |

FOREIGN PATENT DOCUMENTS

| | | |
|---|---|---|
| 0 376 505 A1 | 4/1990 | (EP) . |
| 0 793 307 A2 | 9/1997 | (EP) . |
| 0 871 270 A2 | 10/1998 | (EP) . |

* cited by examiner

*Primary Examiner*—James G. Smith
*Assistant Examiner*—Hadi Shakeri
(74) *Attorney, Agent, or Firm*—Cantor Colburn LLP

(57) ABSTRACT

An improved cable preparation tool and an accompanying method which, when utilized concurrently, prepare fully shielded cables for termination into connecting devices. A preferred embodiment of the tool has hinged first and second tool handles biased together about a hinge by a resilient member. One end of a tool handle is fitted with a receptacle to receive and mount a detachable blade cartridge assembly which cuts the cable jacket and shielding metallic foils wrapped around individual pairs of insulated wires. A second receptacle is provided in either tool handle to receive a detachable template cartridge assembly which is used to properly position wires for termination into a connector. An exemplary method of cable preparation using the tool includes removing a cutting a cable jacket, cutting a plurality of foils and aligning wires using a single cable preparation tool.

15 Claims, 13 Drawing Sheets

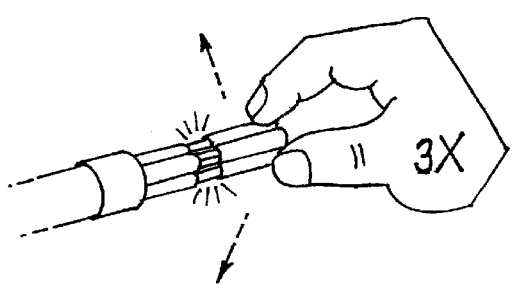 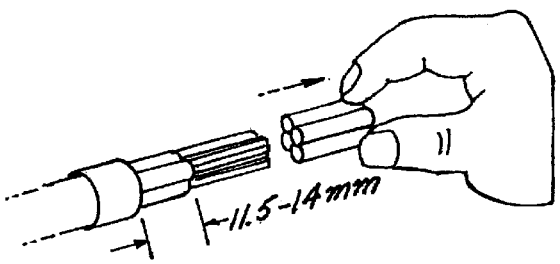
FIG. 11A    FIG. 11B
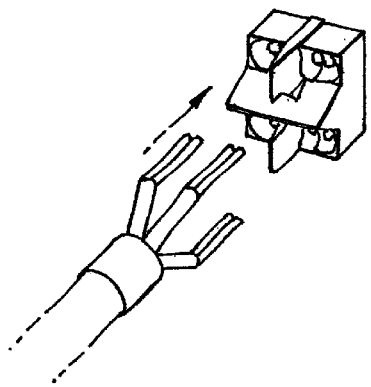
FIG. 12
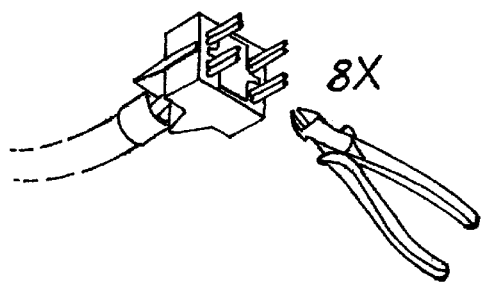
FIG. 13

PREPARATION TOOL FOR SHIELDED CABLES

CROSS-REFERENCE TO RELATED APPLICATIONS

This application claims the benefit of U.S. provisional patent application serial No. 60/110,296 filed Nov. 30, 1998, the entire contents of which are incorporated herein by reference.

BACKGROUND OF THE INVENTION

This invention relates to cable preparation tools, specifically to an improved tool and an accompanying method which, when utilized concurrently, prepare fully shielded cables for termination into connecting devices.

Improvements in telecommunications systems have resulted in the ability to transmit voice and/or data signals along transmission lines at increasingly higher frequencies. Several industry standards specify that multiple performance levels of twisted-pair cabling components have been established. The primary references, considered by many to be the international benchmarks for commercially based telecommunications components and installations, are standards ANSI/TIA/EIA-568-A (/568), Commercial Building Telecommunications Cabling Standard, and 150/IEC 11801 (/11801), Generic Cabling for Customer Premises.

Standards /568 and 11801, as well as other existing national and regional standards, specify use of category 3,4 and 5 cable and connecting hardware. In these specifications, transmission requirements for Category 3 components are specified up to 16 MHZ. Transmission requirements for Category 4 components are specified up to 20 MHZ. Transmission requirements for Category 5 components are specified up to 100 MHZ.

New standards are being developed continuously and currently it is expected that future standards will require transmission requirements of at least 600 MHZ. To achieve such transmission rates, fully shielded twisted pair cable, as shown generally at 10 in FIG. 1, will be necessary. Such cable contains individual insulated wires 16 that are paired with each pair being wrapped in a metallic foil 18. Then the pairs are wrapped together in another layer of foil or screen 14, and finally bound within an insulative jacket 12.

The above referenced transmission requirements also specify limits on near-end crosstalk (NEXT). Telecommunications connectors are organized in sets of pairs, typically made up of a tip and ring connector. As telecommunications connectors are reduced in size, pairs are placed closer to each other creating NEXT between adjacent pairs.

To comply with the NEXT requirements, a variety of techniques are used in the art. U.S. patent application Ser. No. 09/047,046, now U.S. Pat. No. 6,224,423, incorporated herein by reference, describes an enhanced performance telecommunications connector, appearing generally at 20 in FIG. 2, which utilizes overlapping shield members to provide enhanced shielding and reduced crosstalk in the mating of fully shielded cable connectors.

FIG. 3 depicts an exemplary process for installing a cable 10 in a connector 20. The cable is first prepared as shown in FIG. 4. A length (shown as A) of the cable jacket 12 is removed. Then, a second length (shown as B) of the metallic foil 18 is removed. As shown in FIG. 3, the individual wires 16 are aligned and then inserted into termination caps 22. The termination caps 22 are then clamped down to terminate wires 16 on insulation displacement contacts in connector 20.

Traditional methods of preparing fully shielded cable for connector installation require the installer to take measurements by hand, execute multiple stripping actions using several tools, including sharp blades, and arrange wires 16 by hand for insertion into connector. Distances A and B are typically hand measured by the installer. Conventional cable preparation tools, such as that illustrated in FIG. 5 or that produced by Sargent Tool Company, commercially available as '8700 Easy Strip Compress Tool', can be used to remove cable jacket 12. Such conventional tools, however, fail to assist the installer in removing foils 18 and aligning inner wires for insertion into connector. A straight blade, such as a knife or scissors, is traditionally used to individually remove metallic foil 18. Then the installer must visually align wires 16 by hand for insertion into termination caps 22.

Prior art methods of cable preparation involve several tools, multiple steps and result in considerable installation time. Removal of metallic foil 18 by use of an open blade exposes the installer to safety hazards and threatens the severance of individual insulated wires 16. Once wires 16 are exposed, the cable must be installed in the connector. Manual arrangement of wires 16 is time consuming and subject to installer error. If the wires are inserted improperly into the connector, the connector will fail to function properly and additional time and resources will be consumed in making the appropriate corrections. Hence, the need has arisen for a invention which allows a fast, simple, and safe method of preparing fully shielded cable for connector termination by use of one, low-cost tool.

SUMMARY OF THE INVENTION

The above-discussed and other drawbacks and deficiencies of the prior art are overcome or alleviated by the cable preparation tool and cable preparation method of the present invention. The cable preparation tool is designed for use with shielded cable including a plurality of pairs of wires, each pair of wires surrounded by a metallic foil. The tool includes first and second tool handles, a blade assembly, and a template assembly provided in one of said first and second tool handles. A method of preparing the shielded cable includes inserting the cable in a cutting portion of the tool and cutting the cable jacket using the tool. The outer cable jacket is removed and the pairs of wires are placed in the cutting portion of the tool. Each of the foils is cut in one step using the tool.

BRIEF DESCRIPTION OF THE DRAWINGS

Referring now to the drawings wherein the like elements are numbered alike in the several FIGURES:

FIGS. 9–13 are perspective views illustrating the method of preparing fuilly shielded cable for connector termination using the tool of FIG. 6;

DETAILED DESCRIPTION OF THE PREFERRED EMBODIMENTS

Figure 6:
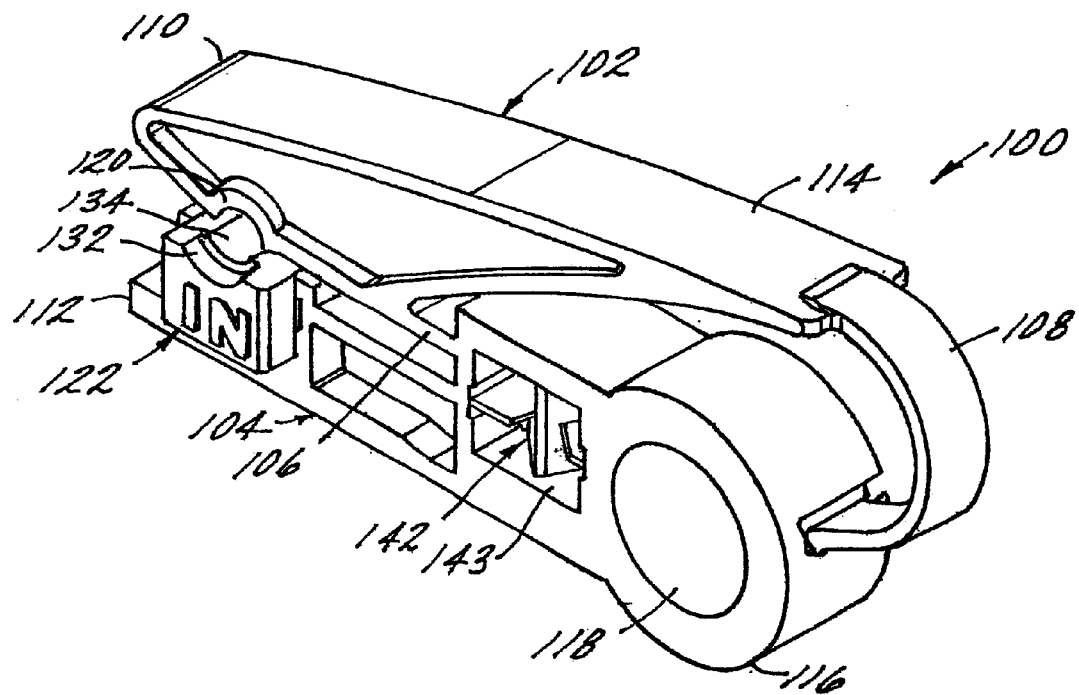
FIG. 6 is a perspective view of a cable preparation tool in an exemplary embodiment of the invention.

FIG. 6 is a perspective view of a cable preparation tool shown generally at 100 as an exemplary embodiment of the present invention. Tool 100 includes tool handles 102 and 104 which are pivotally joined at a hinge 106. Handle 102 has a tool head end 110 and handle 104 has a tool head end 112. Tool handle 102 has a grip end 114 and handle 104 has a grip end 116. Grip end 116 contains a finger bore hole 118. Positioned between grip end 114 and grip end 116 is a resilient member 108. Resilient member 108 biases tool head ends 110 and 112 towards each other as described in further detail herein. A detachable blade cartridge assembly 122 is mounted to tool handle 104 at tool end 112. Blade cartridge assembly 122 includes a blade 136, as shown in FIG. 8B, for scoring the jacket 12 and the foils 18 of shielded cable 10. Blade cartridge assembly 122 contains semi-cylindrical channel 134 and area of enlarged radius 132 which are positioned opposite semi-cylindrical channel 120 of tool handle 102. A detachable template cartridge assembly 142 is mounted to tool handle 104 at cartridge receptacle 143. Template cartridge assembly 142 allows the installer to properly position wires 16 for installation into connector as described in further detail herein. Cartridge receptacle 143 is shaped approximately congruent to insertion side 145 (see FIG. 7C) of template cartridge assembly 142. Cartridge receptacle 143 is sized slightly larger than template cartridge assembly 142 to allow insertion of the latter into the former while still maintaining sufficient friction between contacting surfaces to prevent cartridge dislodgment during tool 100 usage.

Figure 7A:
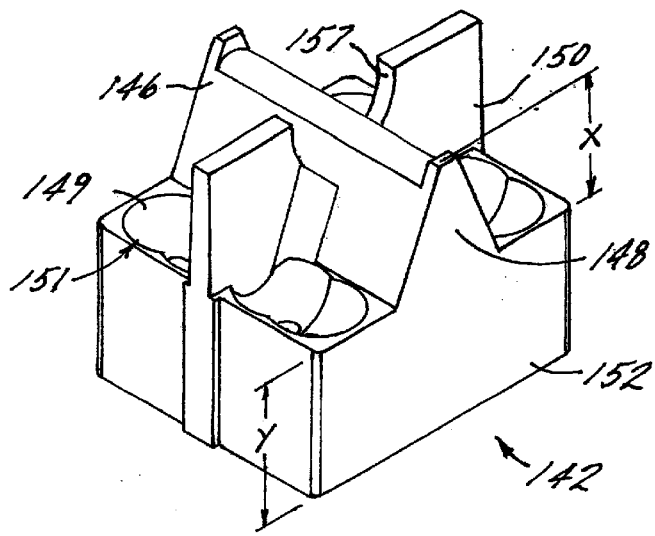
FIGS. 7A, 7B, and 7C depict perspective, top and bottom views, respectively, of the template cartridge assembly 142 contained in tool 100 of FIG. 6.

FIG. 7A depicts a perspective view of template cartridge assembly 142. Template cartridge assembly 142 is comprised of cartridge base 152 upon which a planar extension 150 and an angled extension 148 are mounted. Planar extension 150 contains a semi-cylindrical cut-out 157 to aid in the separation and positioning of wires 16 when inserted into template cartridge assembly 142 in preparation of termination with a connector. Angled extension 148 contains indicia 146 discussed below. Planar extension 150 and angled extension 148 are mounted on cartridge base 152 perpendicular to each other such that four sectors 151 are formed. Funnels 149 are bored into cartridge base 152 in each sector 151. Funnels 149 are conical in shape and taper to holes 144 to guide wires 16 into holes 144 during use of template cartridge assembly 142. The height of angled extension 148 above base 152 and height y of base 152 are established so that a predetermined length of wire extends from the cable jacket 12 after cable preparation as described herein.

Figure 7B:
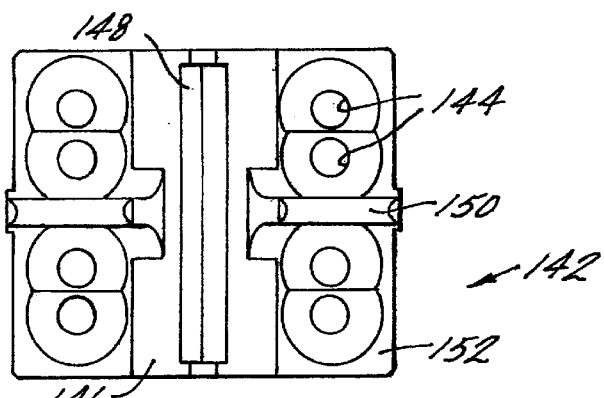

FIG. 7B is a top view of template cartridge assembly 142. Cartridge base 152 contains eight holes 144 paired in each sector 149. Angled extension 148 contains indicia 146 corresponding to each of the eight holes 144. Indicia 146 may be comprised of color codes, words, and/or symbols and may be used to instruct the installer in the proper positioning of each wire 16 for termination into one or several connector types.

Figure 7C:
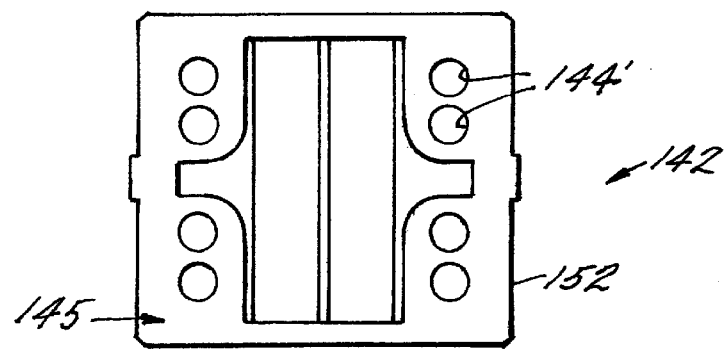
Figure 8B:
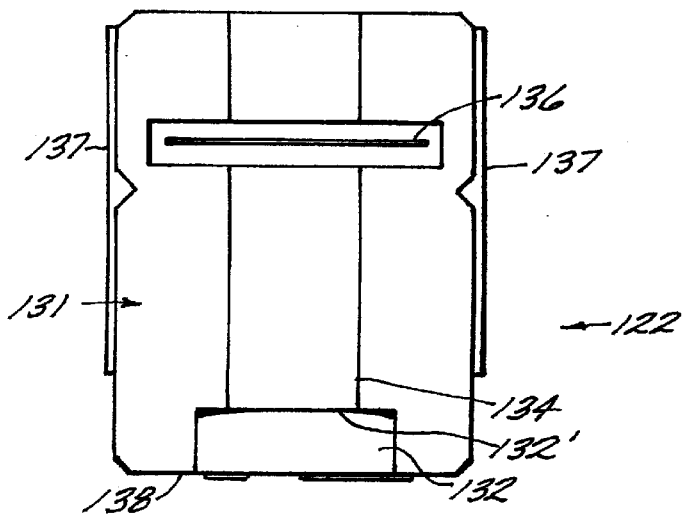
FIGS. 8A, 8B, and 8C depict front, top, and bottom views, respectively, of blade cartridge assembly 122 contained in tool 100 of FIG. 6.

FIG. 7C is a bottom view of template cartridge assembly 142. Template cartridge assembly 142 is placed in cartridge receptacle 143 for use with tool 100 as discussed more fully herein. The bottom 145 of cartridge base 152 includes exit holes 144' which correspond to holes 144 of FIG. 7B.

Figure 8A:
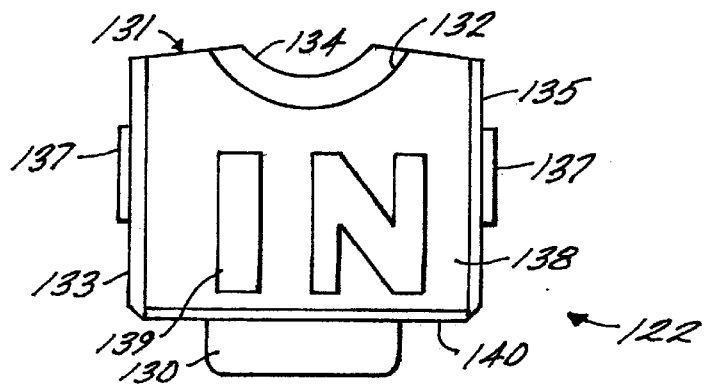

FIG. 8A depicts a front view of blade cartridge assembly 122. Indicia 139 is embossed on front wall 138. Indicia 139 may be comprised of words, symbols, and/or color codes and may indicate the proper direction to direct fully shielded cable 10 onto template blade cartridge assembly 122 when preparing cable for connector installation. Guide rails 137 are mounted on first and second side walls 133 and 135. Contact surface 131 contains semi-cylindrical channel 134 and an area of enlarged radius 132. Stop tab 130 extends from front wall 138 in a direction opposite contact surface 131. Stop tab 130 is a safety precaution which prevents cartridge slippage and blade mishandling during tool usage.

FIG. 8B is a plan view of contact surface 131 of blade cartridge assembly 122. A blade 136 is positioned in semi-cylindrical channel 134 a determined distance from area of enlarged radius 132. This distance corresponds to the length of metallic foil 18 required to remain on each pair of individual insulated wire 16 after scoring, as discussed below in conjunction with FIGS. 10 and 11. Blade 136 is set into blade cartridge assembly 122 to prevent unintended contact with the blade but still allow proper scoring of outerjacket 12 and metallic foils 18.

Figure 8C:
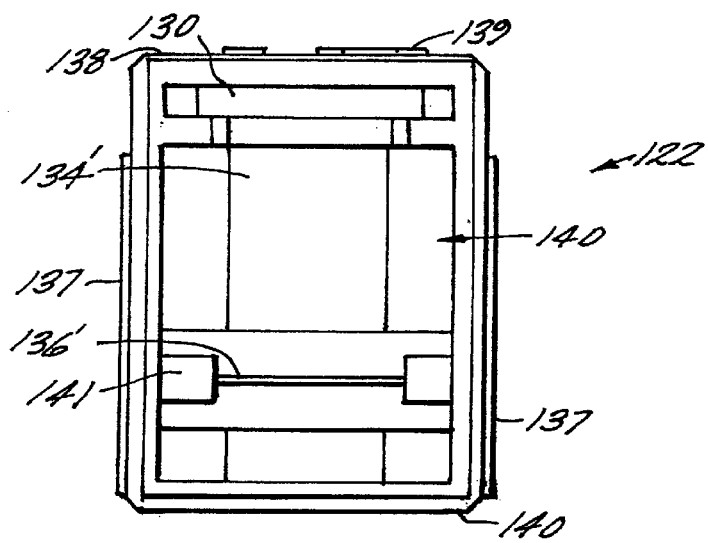

FIG. 8C is a plan view of the bottom surface 140 of blade cartridge assembly 122. Bottom surface 140 is arranged opposite contact surface 131. Blade base 136' mounted to side walls 133 and 135 via mounting members 141.

Figure 9A:
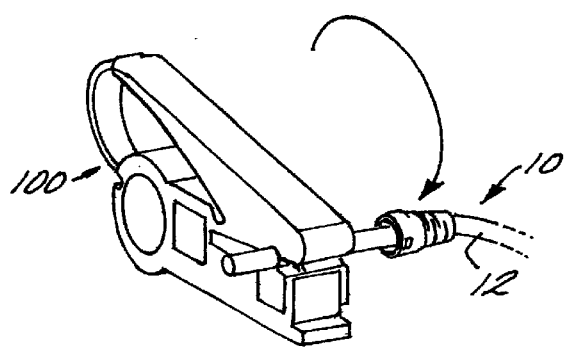
Figure 9B:
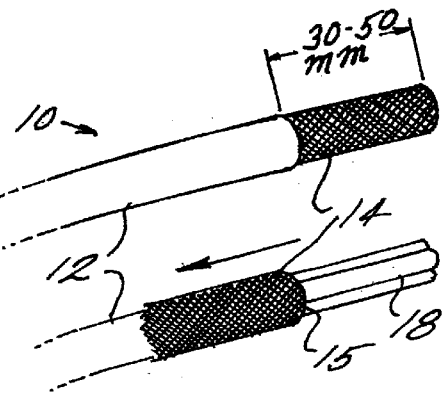

Use of tool 100 will now be described. FIGS. 9A and 9B depict the removal of the cable jacket 12 using tool 100. Handles 102 and 104 of tool 100 are depressed towards each other to spread tool ends 110 and 1 12 apart. Cable 10 is placed in semi-cylindrical channel 134, as shown in FIG. 9A, so that blade 136 contacts cable jacket 12 approximately thirty-five to fifty millimeters from the end to be terminated of fully shielded cable 10. Tool handles 102 and 104 are then released. Tool ends 110 and 112 are biased together by resilient member 108 pressing blade 136 against jacket 12. Tool 100 is then rotated around cable 10 to score cable jacket 12. Scored jacket 12 is removed by hand and metallic braid 14 is folded back at scored jacket edge 15, as shown in FIG. 9B, exposing wires 16 wrapped in metallic foils 18.

Figure 10A:
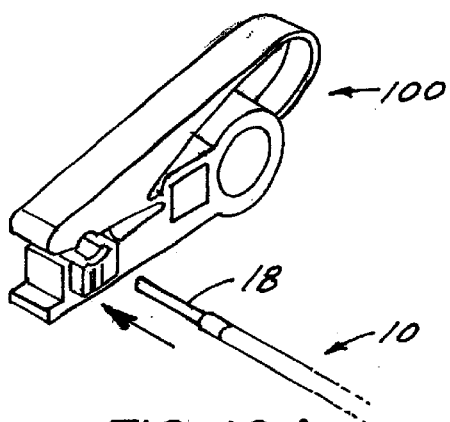
Figure 10B:
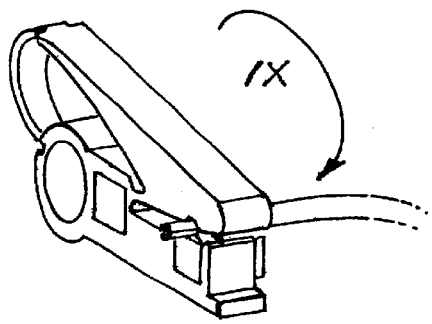

FIGS. 10A and 10B depict the scoring of metallic foil 18 using tool 100. Handles 102 and 104 of tool 100 are depressed towards each other to spread tool ends 110 and 112 apart. The four pairs of wires 16, each surrounded by foil 18, are placed in semi-cylindrical channel 134 simultaneously and arranged so that wires 16 traverse blade 136 with excess wires 16 extending, if necessary, beyond the end of contact surface 131 of blade cartridge assembly 122. The scored jacket edge 15 of jacket 12 abuts inner wall 132' of area of enlarged radius 132. This allows an appropriate distance of eleven and one-half to fourteen millimeters of metallic foils 18 to remain on wires 16 as shown in FIG. 11B. The absence of cable jacket 12 from semi-cylindrical channel 134 while scoring metallic foils 18 allows for unencumbered contact between blade 136 and metallic foils 18. Tool handles 102 and 104 are then released. Tool ends 110 and 112 are biased together by resilient member 108 pressing blade 136 against at least one metallic foil 18. Tool 100 is then rotated once around cable 10 to score the four individual metallic foils 18.

FIGS. 11A and 11B depict the removal of scored metallic foils 18 from wires 16. Wires 16 are bent (e.g., three times) into positions at an angle relative to cable 10 using the score in metallic foils 18 as the axis of rotation, as shown in FIG. 11A. Wires 16 are then returned to a position in line with cable 10 and metallic foils 18 are removed by hand as depicted in FIG. 11B. Approximately eleven and one-half to fourteen millimeters of metallic foils 18 remain wrapped on wires 16.

FIGS. 12 and 13 depict the method of arranging individual wires 16 for insertion into termination caps 22 on connector 20. Based on indicia 146, the wires 16 are positioned in holes 144 of template cartridge assembly 142, as shown in FIG. 12. Wires 16 that emerge from exit holes 144' are severed and discarded as shown in FIG. 13. As noted above, the height, x, of angled extension 148 and height, y, of base 152 establish the amount of wire 16 that extends from cable jacket 12 after severing wires 16 as shown in FIG. 13. Wires 16 are removed from template cartridge assembly 142. Fully shielded cable 10 is now prepared for termination on insulation displacement contacts in connector 20.

Figure 14:
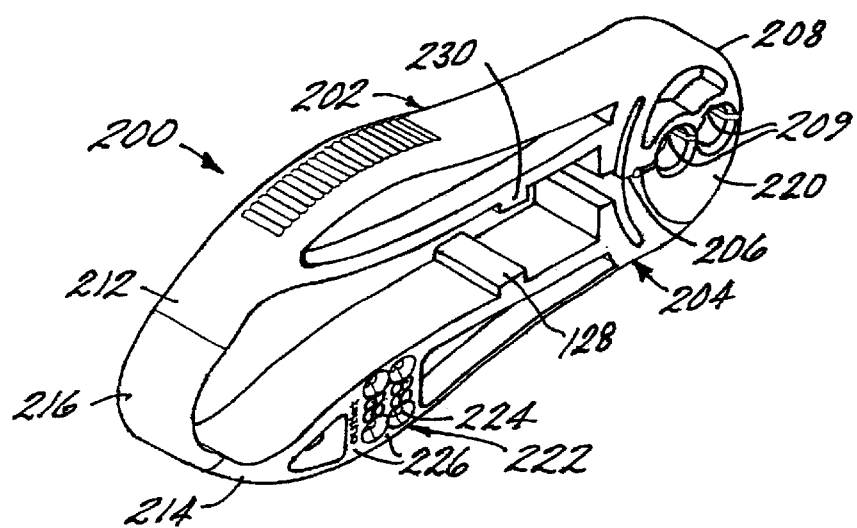
FIG. 14 is a perspective assembled view of a tool in an alternative embodiment of the invention.

FIG. 14 is a perspective view of cable preparation tool 200, an alternative embodiment of the invention. Tool 200 includes first and second tool handles 202 and 204 which are pivotally joined at a hinge 206. Handle 202 has a tool head end 208 and handle 204 has a tool head end 210 (shown in FIG. 15). Tool handle 202 has a grip end 212 and handle 204 has a grip end 214. Positioned between grip end 212 and grip end 214 is a resilient member 216 which biases tool head ends 208 and 210 towards each other as described in further detail herein. A detachable tool head 220 is mounted to handle 204 and includes a blade for scoring the jacket 12 and the foils 18 of shielded cable 10. Handle 202 includes channels 209 that are positioned opposite channels in detachable tool head 220.

Tool handle 204 includes a template 222 comprised of eight holes 224 and indicia 226 positioned adjacent to the holes. The template 222 allows the installer to arrange the wires 16 in the proper locations by positioning the wires 16 in holes 224. The indicia adjacent to the holes 224 instruct the installer as to which wire is to be positioned in each hole 224. Wires 16 in cable 10 are typically color coded and thus indicia 226 on template 222 may be color coded instructing the installer of the proper position for each wire 16. Indicia 226 may also include words for indicating to the installer the type of connector the template 222 is used with (e.g. an outlet). On the inside of handles 204 and 202 are protrusions 228 and 230 each having a surface for contacting termination caps 22.

Figure 15:
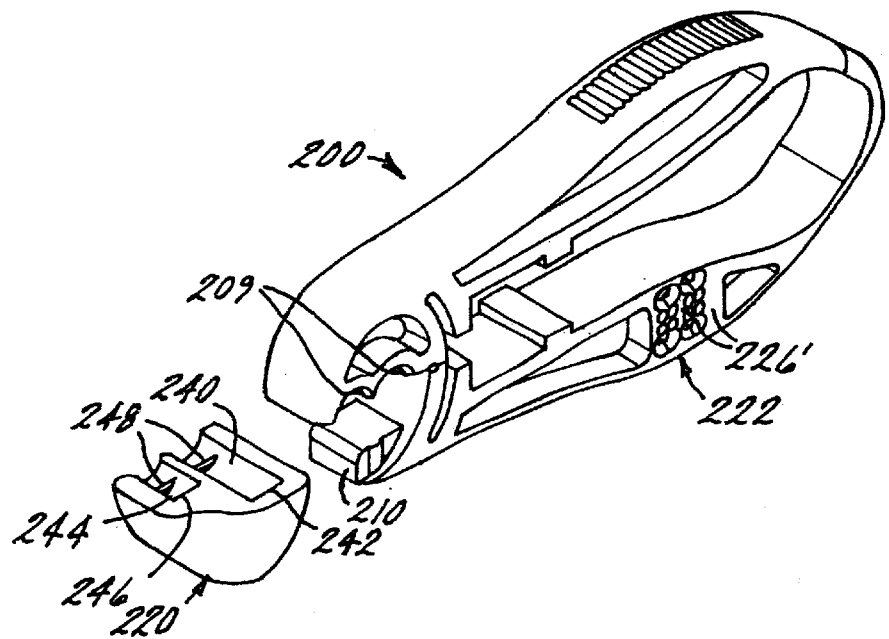
FIG. 15 is a perspective exploded view of the tool of FIG. 14.

FIG. 15 is an exploded, perspective view of tool 200 showing tool head 220 detached. Tool head 220 includes a semi-cylindrical first channel 240 having an end wall 242 and a semi-cylindrical second channel 244 having an end wall 246. A blade 248 is positioned in each channel. FIG. 15 depicts the template 222 which may include indicia 226' different from the indicia 226 on the opposite side of handle 204. The indicia 226' may be color codes instructing the installer of the proper position for each wire. Indicia 226' may also include words for indicating to the installer the type of connector the template 222 is used with (e.g. a plug). The use of different indicia on each side of handle 204 allows a template for two different components (e.g. an outlet and a plug).

Figure 16A:
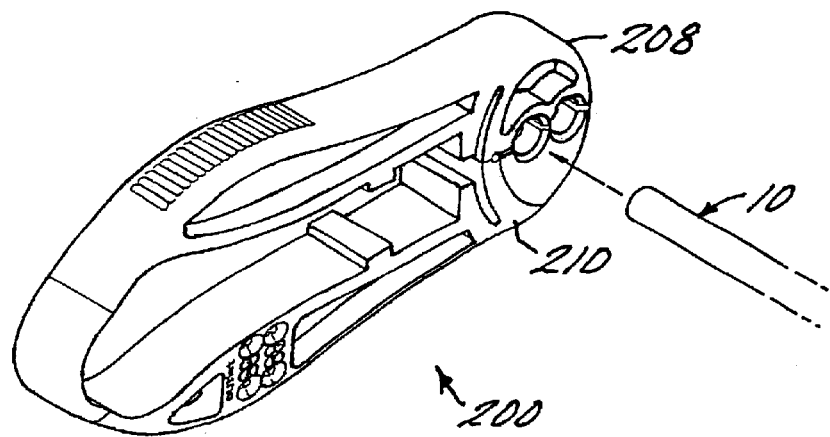
FIGS. 16–19 are perspective views illustrating the preparation of a fully shielded cable for connector termination using the tool of FIG. 14.
Figure 16B:
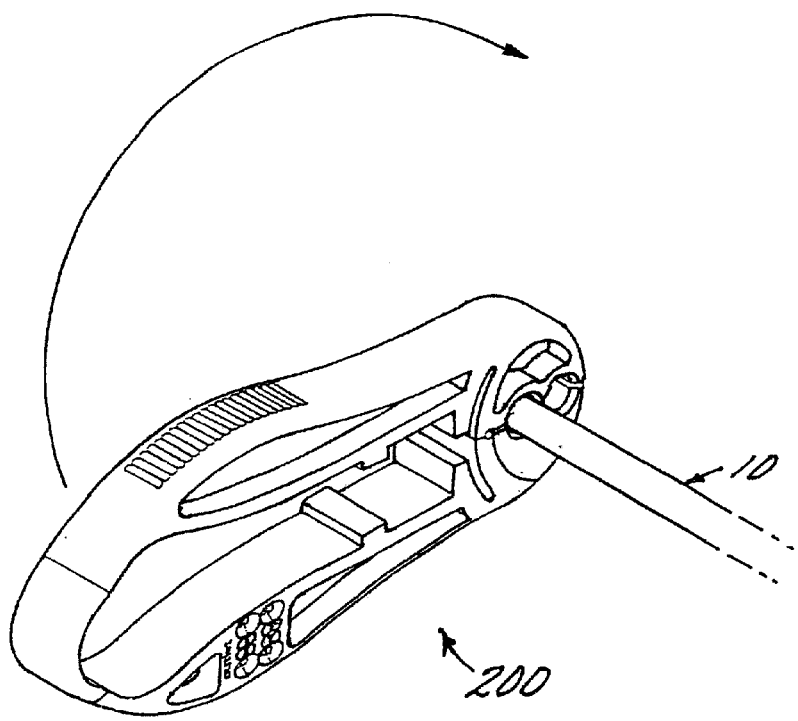
Figure 21:
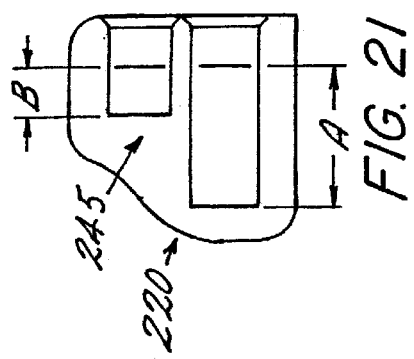
FIG. 21 is a plan view of contact surface 245 of detachable tool head 220.

Use of tool 200 will now be described. FIGS. 16A and 16B depict the removal of the cable jacket 12 using tool 200. Handles 202 and 204 are depressed towards each other as indicated by arrows A to spread tool head ends 208 and 210 apart. Cable 10 is placed in first channel 240 abutting end wall 242. As described below with reference to FIGS. 20 and 21, the end wall 242 of channel 240 is positioned so that a predetermined amount of the jacket 12 will be removed. Handles 202 and 204 are released and spring member 216 biases tool head ends 208 and 210 towards each other. Blade 248 contacts the jacket 12. Tool 200 is then rotated around cable 10 as shown in FIG. 16B to score the jacket 12 which then can be removed by hand.

Figure 17A:
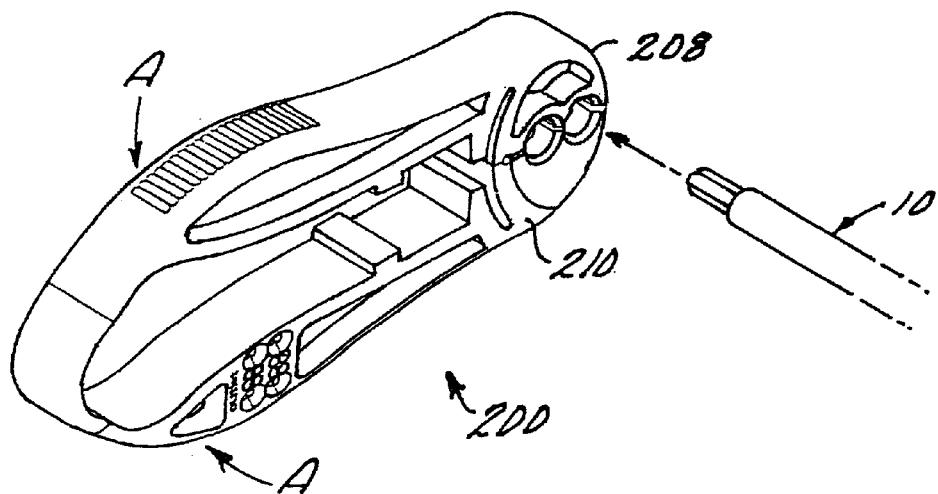
Figure 17B:
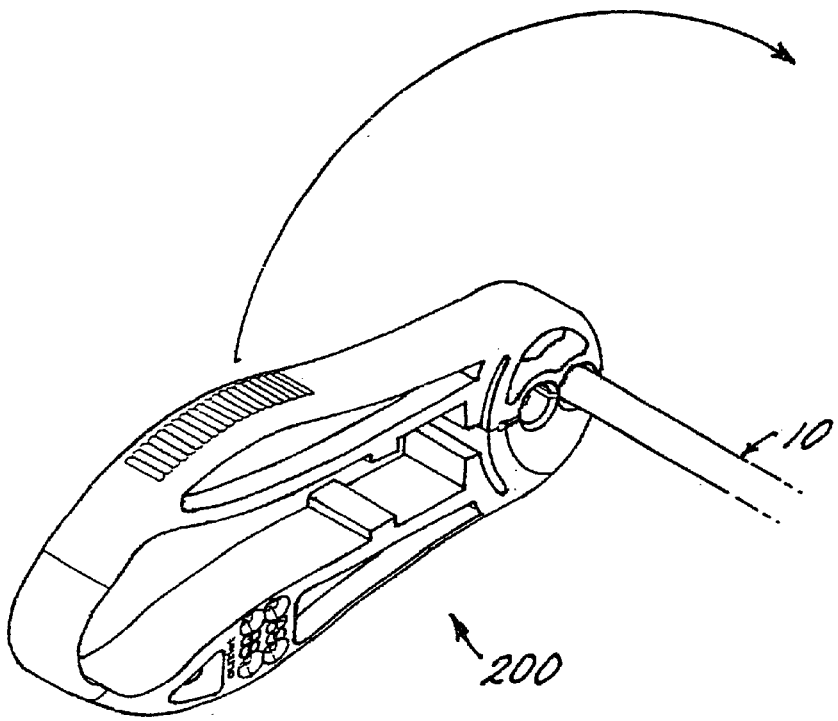

FIGS. 17A and 17B depict removal of the foils 18 using tool 200. Handles 202 and 204 are depressed towards each other as indicated by arrows A to spread tool head ends 208 and 210 apart. The four pairs of wires 16, each surrounded by foil 18, are placed in second channel 244 simultaneously so that the ends of wires 16 abut 246. Second channel 244 may have a radius less than that of first channel 240. As described below with reference to FIGS. 20 and 21, the end wall 246 of channel 244 is positioned so that a predetermined amount of the foils 18 will be removed. Handles 202 and 204 are released and spring member 216 biases tool head ends 208 and 210 towards each other. Blade 248 contacts at least one foil 18. Tool 200 is then rotated around cable 10 as shown in FIG. 17B to score the four individual foils 18 which then can be removed by hand.

Figure 18A:
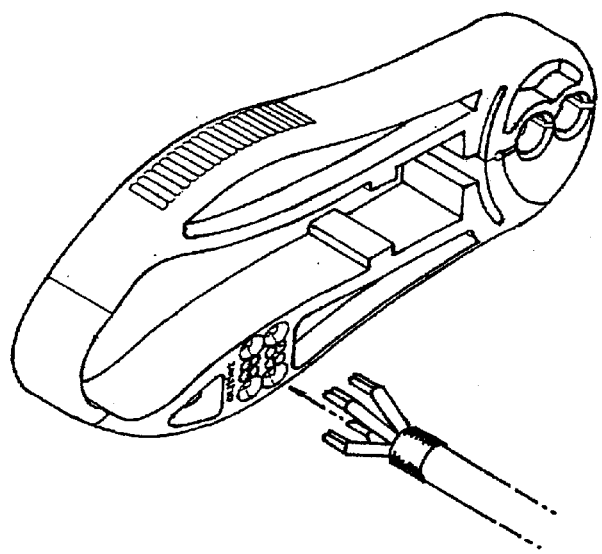
Figure 18B:
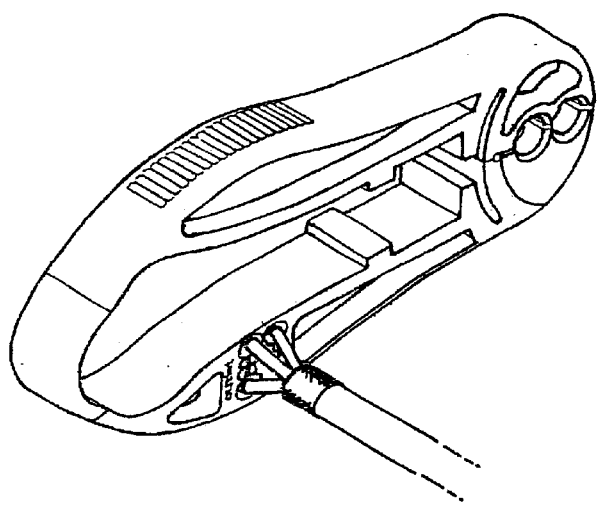

FIGS. 18A and 18B depicts the usage of template 222 to arrange the individual wires 16 for connector termination. Based on indicia 226 or 226'(depending on the installation) the wires 16 are positioned in holes 224 in template 222 to properly position wires 16 for installation with a connector.

Figure 19:
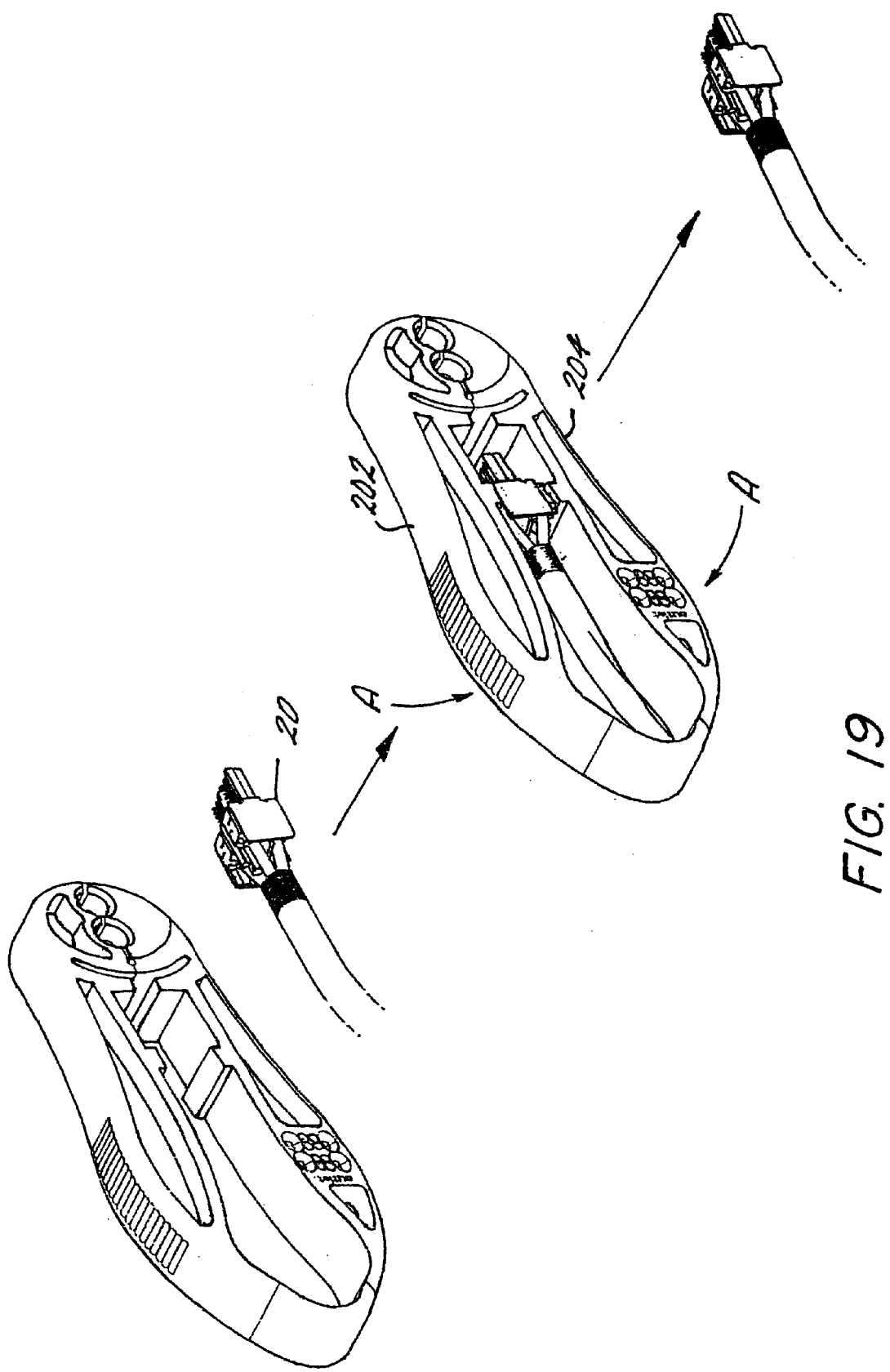

FIG. 19 depicts the step of terminating the wires to a connector. Wires 16 are positioned in termination caps 22 of connector 20 in the proper order as established by template 222. The connector 20 is positioned between handles 202 and 204 so that the termination caps 22 are positioned adjacent protrusions 228 and 230. Handles 202 and 204 are depressed towards each other as indicated by arrows A driving the termination caps 22 into the connector 20 and terminating wires 16 on insulation displacement contacts in connector 20.

Figure 1:
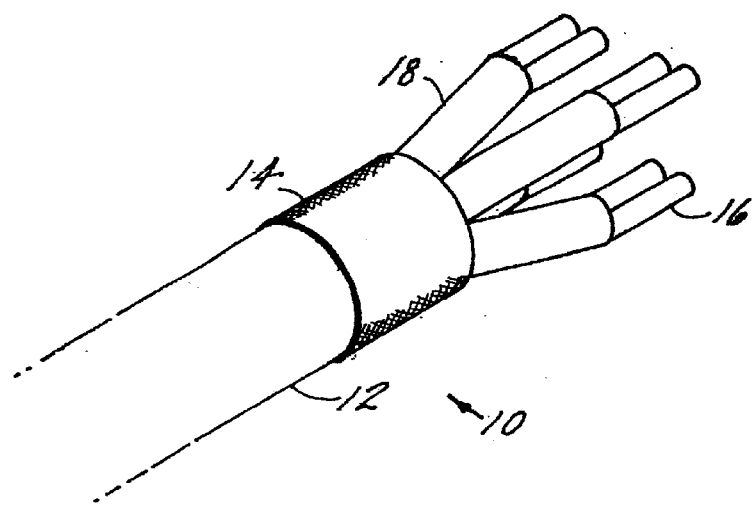
FIG. 1 is a perspective view of a conventional fully shielded cable.
Figure 2:
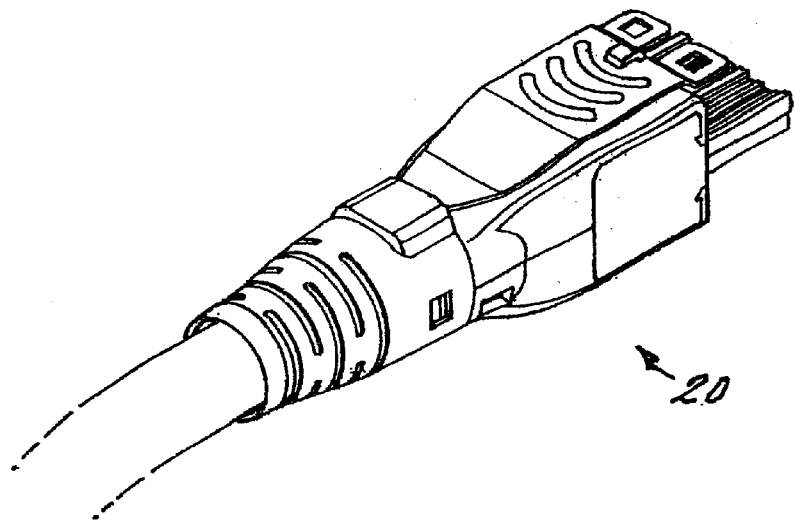
FIG. 2 is a perspective view of a connector for use with the fully shielded cable of FIG. 1.
Figure 3:
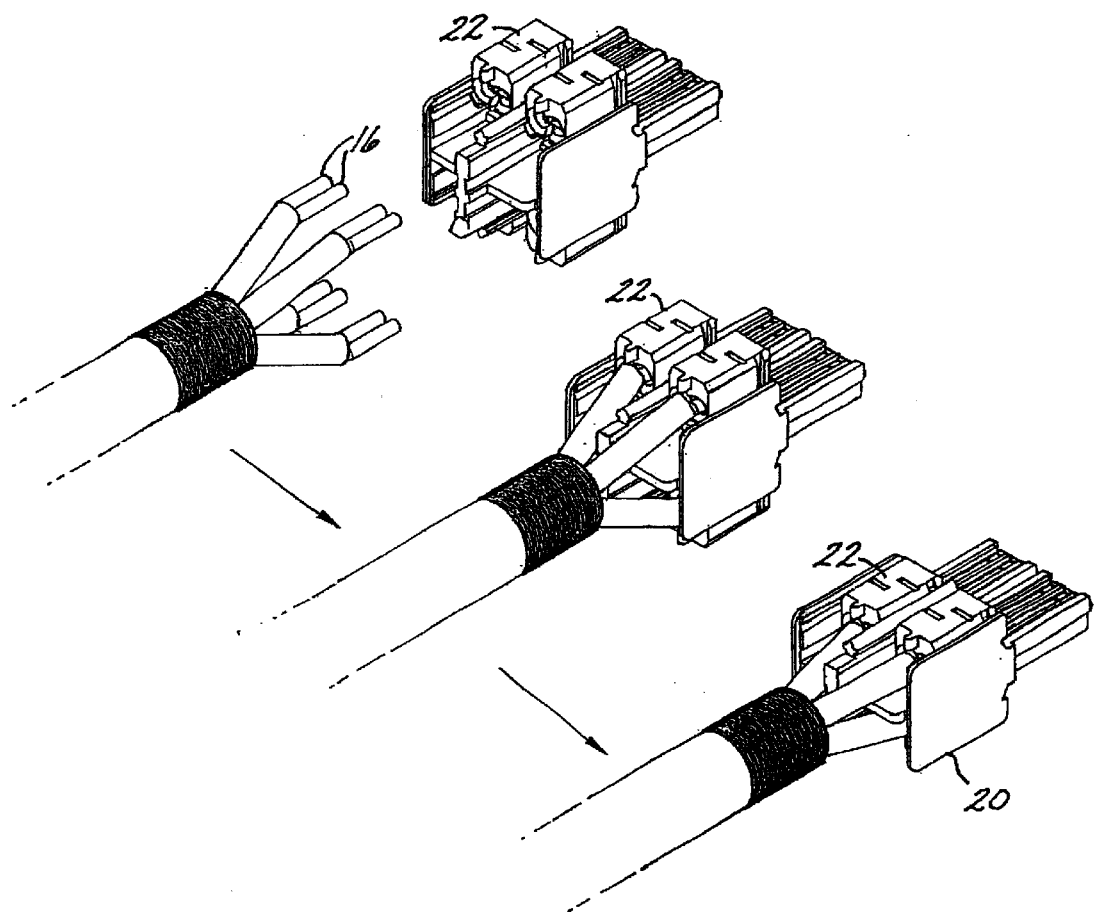
FIG. 3 is perspective view of the process for connecting the cable of FIG. 1 with the connector of FIG. 2.
Figure 4:
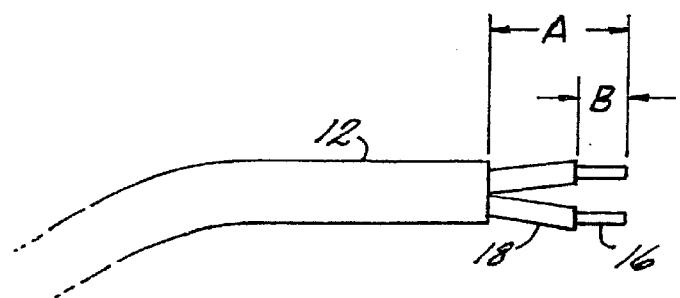
FIG. 4 illustrates the cable of FIG. 1 prepared for installation with the connector of FIG. 2.
Figure 5:
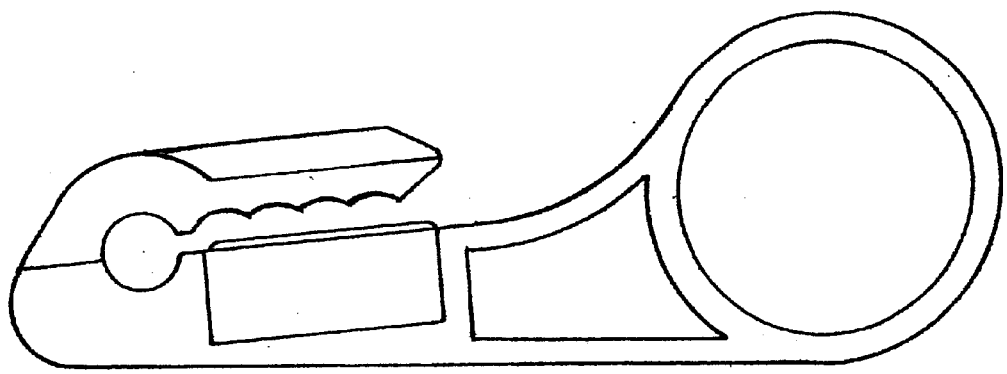
FIG. 5 is a side view of a conventional tool for removing the jacket from the cable of FIG. 1.
Figure 20:
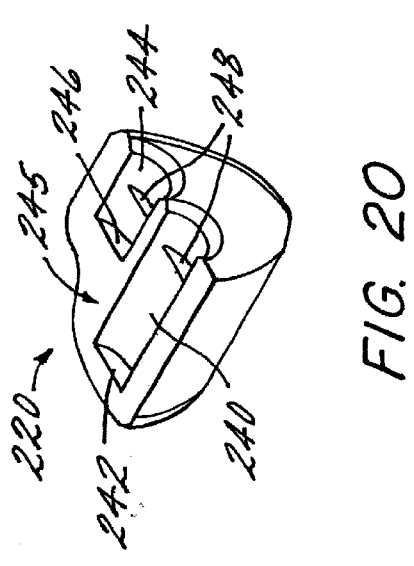
FIG. 20 is a perspective view of detachable tool head 220.

FIG. 20 depicts tool head 220. In first channel 240, the distance from the blade 248 to the end wall 242 is equal to length A shown in FIG. 4. As described above, to remove the jacket 12, the cable 10 is inserted into channel 240 until the cable end contacts end wall 242. This ensures that the right amount of jacket 12 is removed. Similarly, in channel 244 the distance between blade 248 and end wall 246 is equal to length B shown in FIG. 4. To remove the foils 18, the pairs of wires 16 are positioned in channel 244 until the ends of the pairs of wires 16 contact end wall 246. This ensures that the right amount of foil is removed.

Figure 23:
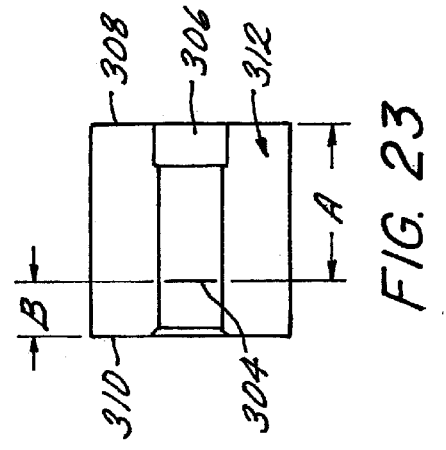
FIG. 23 is a plan view of contact surface 312 of second detachable tool head 300.
Figure 22:
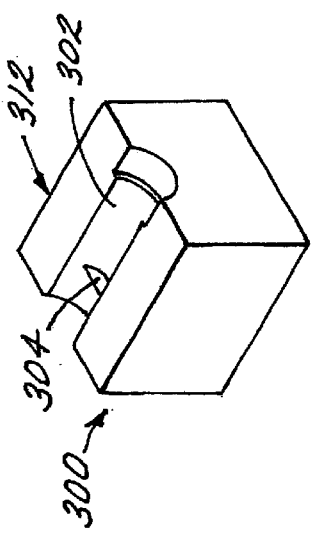
FIG. 22 is a perspective view of second detachable tool head 300.

FIGS. 22 and 23 depict an alternative tool head 300 having a single channel 302. It is understood that tool 200 would be modified to have a single semi-cylindrical channel aligned with channel 302 when using tool head 300. The tool head 300 has a first side wall 308 and a second side wall 310, as shown in FIG. 23. Blade 304 is positioned a distance A from the first side wall 308 and positioned a distance B from the second side wall 310. To remove the jacket 12, the cable 10 is inserted in channel 302 from side wall 310 until the end of the cable 10 is aligned with wall 308. The tool is then rotated to score the jacket 12 at the appropriate position. To remove the foils 18, the cable 10 is inserted in channel 302 from side wall 308 until the ends of the pairs of wires 16 are aligned with wall 310. The tool is then rotated to score the foils 18 at the appropriate position. Channel 302 includes an area of enlarged radius 306 (relative to the remainder of channel 302) that receives the cable jacket 12 when the foils 18 are being scored. The area of enlarged radius 306 allows the foils 18 to contact blade 304. Without area 306, the jacket 12 could prevent the foils 18 from contacting blade 304.

The present invention provides a tool for removing the outer jacket, removing the foils and arranging the inner wires of fully shielded cable for termination onto a connector. The present invention reduces labor costs by reducing installation time, eliminates the need for multiple tools, and ensures the safety of the installer by eliminating the use of open blades. The invention has been described in connection with a shielded cable having four pairs of wires with each pair encased in a foil. It is understood that the invention may be adapted to use with different cable configurations such as two-pair.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A device for the preparation of shielded cable including a plurality of pairs of wires, each pair of wires surrounded by a metallic foil, the device comprising:

first and second tool handles, a blade assembly, and a template provided in one of said first and second tool handles, said template including a plurality of holes for positioning the pairs of wires for installation in a connector, a total number of holes being equal to a number of wires in the cable.

2. The device of claim 1 wherein said first and second tool handles are adjoined pivotably by a hinge element.

3. The device of claim 1 further comprising:

a cartridge receptacle formed in one of said first and second tool handles for receiving said template.

4. The device of claim 1 wherein each of said first and second tool handles have a grip end and a tool head end.

5. The device of claim 4 further comprising:

a resilient member for biasing tool head ends of the first and second tool handles together.

6. The device of claim 1 wherein said blade assembly comprises a cartridge removably mounted to one of said first and second tool handles, said blade assembly having a contact surface and a blade.

7. The device of claim 6 wherein said contact surface contains a semi-cylindrical channel and an area of enlarged radius relative to the semi-cylindrical channel.

8. The device of claim 6 wherein said blade is positioned a predetermined distance from an edge of said contact surface, said predetermined distance corresponding to a length of metallic foil to be exposed after preparation of the cable.

9. The device of claim 6 further comprising:

a stop tab mounted perpendicular to the contact surface for contacting one of said first and second tool handles.

10. The device of claim 6 further comprising:

indicia on said blade assembly for identifying a cable insertion direction.

11. The device of claim 1 wherein said template comprises:

a base, a planar extension extending from said base, and an angled extension extending from said base.

12. The device of claim 11 wherein said planar extension and said angled extension define a plurality of sectors in said template.

13. A device for the preparation of shielded cable including a plurality of pairs of wires, each pair of wires surrounded by a metallic foil, the device comprising:

first and second tool handles, a blade assembly, and a template assembly provided in one of said first and second tool handles wherein said template assembly comprises:

a base, a planar extension extending from said base, and an angled extension extending from said base wherein said planar extension and said angled extension define a plurality of sectors in said template assembly wherein each said sectors includes a number of holes, a total number of holes corresponding to a number of wires contained in the cable.

14. The device of claim 11 wherein said angled extension includes indicia for instructing a user of said device as to insertion of the wires into said template assembly.

15. A device for the preparation of shielded cable including a plurality of pairs of wires, each pair of wires surrounded by a metallic foil, the device comprising:

first and second tool handles, a blade assembly, and a template assembly provided in one of said first and second tool handles wherein said template assembly comprises:

a base, a planar extension extending from said base, and an angled extension extending from said base wherein said planar extension further contains a semi-cylindrical cut-out positioned at an intersection between said planar extension and said angled extension.

* * * * *

UNITED STATES PATENT AND TRADEMARK OFFICE
CERTIFICATE OF CORRECTION

PATENT NO. : 6,324,945 B1
DATED : December 4, 2001
INVENTOR(S) : Lo et al.

It is certified that error appears in the above-identified patent and that said Letters Patent is hereby corrected as shown below:

Column 4,
Line 39, before "12 and" delete "outerjacket" and insert therefor -- outer jacket --
Line 42, after "136" insert therefor -- is --
Line 47, after "110 and" delete "1 12" and insert therefor -- 112 --

Column 5,
Line 6, after "ends" delete "1"
Line 7, before "and" delete "10" and insert therefor -- 110 --

Signed and Sealed this

Twenty-first Day of June, 2005

JON W. DUDAS
*Director of the United States Patent and Trademark Office*